United States Patent
Minato

(10) Patent No.: US 8,391,718 B2
(45) Date of Patent: Mar. 5, 2013

(54) PASSIVE OPTICAL COMMUNICATION NETWORK SYSTEM EXTENDABLE WITH CODEC MODULES

(75) Inventor: Naoki Minato, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 232 days.

(21) Appl. No.: 12/929,731

(22) Filed: Feb. 11, 2011

(65) Prior Publication Data

US 2011/0243560 A1 Oct. 6, 2011

(30) Foreign Application Priority Data

Apr. 2, 2010 (JP) ................................. 2010-086179

(51) Int. Cl.
*H04J 14/00* (2006.01)
(52) U.S. Cl. .............. 398/78; 398/77; 398/72; 398/183; 398/190; 398/100
(58) Field of Classification Search ............ 398/77, 398/78, 79, 66, 67, 68, 69, 70, 71, 72, 98, 398/99, 100, 183, 189, 190, 63, 58, 75, 84, 398/87, 89
See application file for complete search history.

(56) References Cited

U.S. PATENT DOCUMENTS 7,792,427 B1 * 9/2010 Uhlhorn et al. ................. 398/77
7,949,254 B1 * 5/2011 Stevens ........................... 398/40

FOREIGN PATENT DOCUMENTS

JP 2009-024733 A 2/2009

OTHER PUBLICATIONS

N. Kataoka, et al., "Field Trial of Duplex, 10 Gbps x 8-User DPSK-OCDMA System Using a Single 16x16 Multi-Port Encoder/Decoder and 16-Level Phase-Shifted SSFBG Encoder/Decoders," Journal of Lightwave Technology, vol. 27, No. 3, Feb. 1, 2009, pp. 299-305.

* cited by examiner

Primary Examiner — Hanh Phan
(74) Attorney, Agent, or Firm — Rabin & Berdo, P.C.

(57) ABSTRACT

In a passive optical communication network system, an optical signal OCDM-coded is transmitted from an OLT to a first port of a circulator, which in turn transfers the signal from its second port to one end of a first SSFBG. The first SSFBG then decodes the signal of one channel to output the decoded signal from its one end to the second port of the circulator, which in turn transmits the decoded signal from its third port to an ONU. When the ONU transmits an optical signal to the third port of the circulator, the circulator transfers the signal from its fourth port to one end of a second SSFBG, which in turn encodes the signal to output the encoded signal from its one end to the fourth port of the circulator. The circulator then transmits the encoded signal from its first port to the OLT.

5 Claims, 4 Drawing Sheets

PASSIVE OPTICAL COMMUNICATION NETWORK SYSTEM EXTENDABLE WITH CODEC MODULES

BACKGROUND OF THE INVENTION

1. Field of the Invention

The present invention relates to a telecommunications network system, and more particularly to a passive optical communication network system using an optical code division multiplexing scheme.

2. Description of the Background Art

In recent years, a demand for telecommunications has been rapidly increased as the Internet diffuses, for example. High-speed large-capacity telecommunications networks have accordingly been built, using optical fibers. Additionally, in order to develop large-capacity telecommunications, an optical multiplexing system is considered important which transfers a set of optical pulse signals for plural channels over a single optical fiber transmission line.

As one of the optical multiplexing systems, the optical code division multiplexing (OCDM) has been developed. The OCDM has such advantages that physical resources such as time slots and wavelengths are not occupied exclusively by one channel, that passive devices can be used as encoder and decoder components, and that synchronization may not be established between channels. Therefore, by using the OCDM, physical resources are not occupied by one channel to thereby save telecommunications resources, and passive devices can be used to directly encode and decode optical signals to thereby accomplish high-speed processing. Additionally, since a function for synchronizing channels with each other is not required, systems may be configured simply. Due to these advantages, the OCDM is expected to be a solution applicable to fiber-to-the-user systems for use in broadband networks.

In fiber-to-the-user optical networks, one optical line terminal (OLT) on the premises of a communication station is connected to one or more optical network units (ONUs) on the premises of subscriber or subscribers, so that subscribers transmit and receive information to and from an external network through optical transmission between the ONUs and the OLT. The transmission lines are configured by optical fibers, which are connected to a star coupler as an inexpensive passive device to thereby establish multiple access between the plural ONUs and the OLT. Specifically, such a network system comprises an OLT interconnected by an optical fiber to a star coupler, which is interconnected to ONUs by a corresponding plurality of optical fibers. Optical networks thus configured only by passive devices such as optical fibers and star coupler are called passive optical networks (PONs), some of which have so far been standardized as a demand for telecommunications and innovation in technology develop. Particularly, schemes based on time compression multiplexing, such as Broadband-PON and Ethernet-PON, have been put into practice.

Japanese Patent Laid-Open Publication No. 2009-24733 and N. Kataoka, et al., "Field Trial of Duplex, 10 Gbps×8-User DPSK-OCDMA System Using a Single 16×16 Multi-Port Encoder/Decoder and 16-Level Phase-Shifted SSFBG Encoder/Decoders", Journal of Lightwave Technology Vol. 27, No. 3, Feb. 1, 2009, pp. 299-305, disclose examples of a PON system using the OCDM. In the examples, the OLT includes a single optical encoder called a multi-port optical encoder for use in encoding or decoding signals on all channels, in order to simplify the configuration of the system. The ONU includes a super-structured fiber Bragg grating (SS-FBG) and a circulator for use in encoding or decoding only signals on a necessary channel, in order to simplify the configuration of the system. The network has a star-shaped topology. On the downstream traffic, i.e. traffic from the OLT to the ONUs, the power of an OCDM signal transmitted from the OLT is split by the sole star coupler to arrive at all the ONUs. On the up-going traffic, i.e. traffic from the ONUs to the OLT, the power of single-channel encoded signals transmitted from all the ONUs are combined by the sole star coupler to arrive at the OLT in the form of single OCDM signal.

It is preferable to adapt a communication station having its capacity sufficient for accommodating an increased number of subscribers since the OLTs are suppressed from increasing in number and hence the space for installation and power consumption are decreased accordingly. Therefore, one of the requirements for designing an optical network may be involved in increasing the loss budget of the system. In order to increase the loss budget, a loss caused by an extended transmission distance and an increased number of branches has to be suppressed by (A) raising the transmission power, (B) lowering the optical sensitivity, and (C) raising the availability of power of an optical signal. The measure (A) causes the power consumption of a transmitter to increase, and the measure (B) causes devices configuring a receiver to be so sophisticated as to be expensive. Thus, the measure (C) will be described below.

On the downstream traffic of the above-described OCDM-PON, the multiplexed signal transmitted from the OLT for simultaneous delivery on plural channels is split by the star coupler. Then, when the split optical signals arrive at the ONUs, the multiplexed signals are decoded in order to separate the channels. Therefore, if all the channels included in the multiplexed signal have their power equal to one another, the optical signal has its power decreased (branching loss) due to the star coupler to a value equal to a fraction of the number of branches from transmitted to received, and further due to a decoder to a value equal to a fraction of the number of multiplexed channels. The number of branches in a star coupler is usually fixed when installed first. Therefore, once the number of branches is fixed when a system is installed first, the branching loss remains as it is even if subscribers or multiplexed channels increase or decrease in number.

SUMMARY OF THE INVENTION

It is therefore an object of the present invention to provide a passive optical communication network system and a codec module therefor in which the power loss of an optical signal otherwise caused by branching can be minimized to thereby improve the availability of the power of the optical signal.

In accordance with the present invention, a passive optical communication network system comprises: a first optical line termination unit for use in a communication station for transmitting on a first optical transmission line an optical signal carrying information of a plurality of channels encoded by optical code division multiplexing, and for decoding an optical signal supplied from the first optical transmission line to receive information of the plurality of channels; a second optical line termination unit for use at a subscriber site for transmitting and receiving the optical signal of one of the plurality of channels on a second optical transmission line; a first super-structured fiber Bragg grating (SSFBG) having a first one end and a first other end for receiving the encoded optical signal on the first one end to decode an optical signal of the one channel to output the decoded optical signal from the first one end, and to output an optical signal of channels other than the one channel from the first other end; a second SSFBG having a second one end and a second other end for receiving the optical signal of the one channel on the second one end to encode the optical signal of the one channel to output the encoded optical signal from the second one end, and for receiving the optical signal on the second other end to output the received optical signal from the second one end; a first circulator having first to fourth ports for receiving the optical signal on the first port from the first optical transmission line to output the received optical signal from the second port to the first one end of the first SSFBG, for receiving the decoded optical signal on the second port from the first one end of the first SSFBG to output the decoded optical signal from the third port to the second optical transmission line, for receiving the optical signal on the third port from the second optical transmission line to output the received optical signal from the fourth port to the second one end of the second SSFBG, and for receiving the encoded optical signal on the fourth port from the second one end of the second SSFBG to output the encoded optical signal from the first port to the first optical transmission line; and a second circulator having fifth, sixth and seventh ports for receiving the optical signal on the fifth port from the first other end of the first SSFBG to output the received optical signal from the sixth port, and for receiving the encoded optical signal on the sixth port to output the encoded optical signal from the seventh port to the second other end of the second SSFBG.

In accordance with one aspect of the invention, a codec module for use in a passive optical network comprises: a first super-structured fiber Bragg grating (SSFBG) having a first one end and a first other end for receiving an optical signal encoded by optical code division multiplexing on the first one end to decode an optical signal of a predetermined channel to output the decoded optical signal from the first one end, and to output an optical signal of channels other than the predetermined channel from the first other end; a second SSFBG having a second one end and a second other end for receiving the optical signal of the predetermined channel on the second one end to encode the optical signal of the predetermined channel to output the encoded optical signal from the second one end, and for receiving the optical signal on the second other end to output the received optical signal from the second one end; a first circulator having first to fourth ports for receiving the optical signal on the first port to output the received optical signal from the second port to the first one end of the first SSFBG, for receiving the decoded optical signal on the second port from the first one end of the first SSFBG to output the decoded optical signal from the third port, for receiving the optical signal on the third port to output the received optical signal from the fourth port to the second one end of the second SSFBG, and for receiving the encoded optical signal on the fourth port from the second one end of the second SSFBG to output the encoded optical signal from the first port; and a second circulator having fifth, sixth and seventh ports for receiving the optical signal on the fifth port from the first other end of the first SSFBG to output the received optical signal from the sixth port, and for receiving the encoded optical signal on the sixth port to output the encoded optical signal from the seventh port to the second other end of the second SSFBG.

In accordance with a passive optical communication network system of the present invention, a loss specific to, and depending upon, the number of branches does not affect optical signals, thus improving the availability of the power of optical signals. Additionally, it is advantageous that an optical line terminal at the premises of a communication station and an optical network unit at the premises of a subscriber are simply connected to respective single optical transmission lines, thus allowing bidirectional communications to be established.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
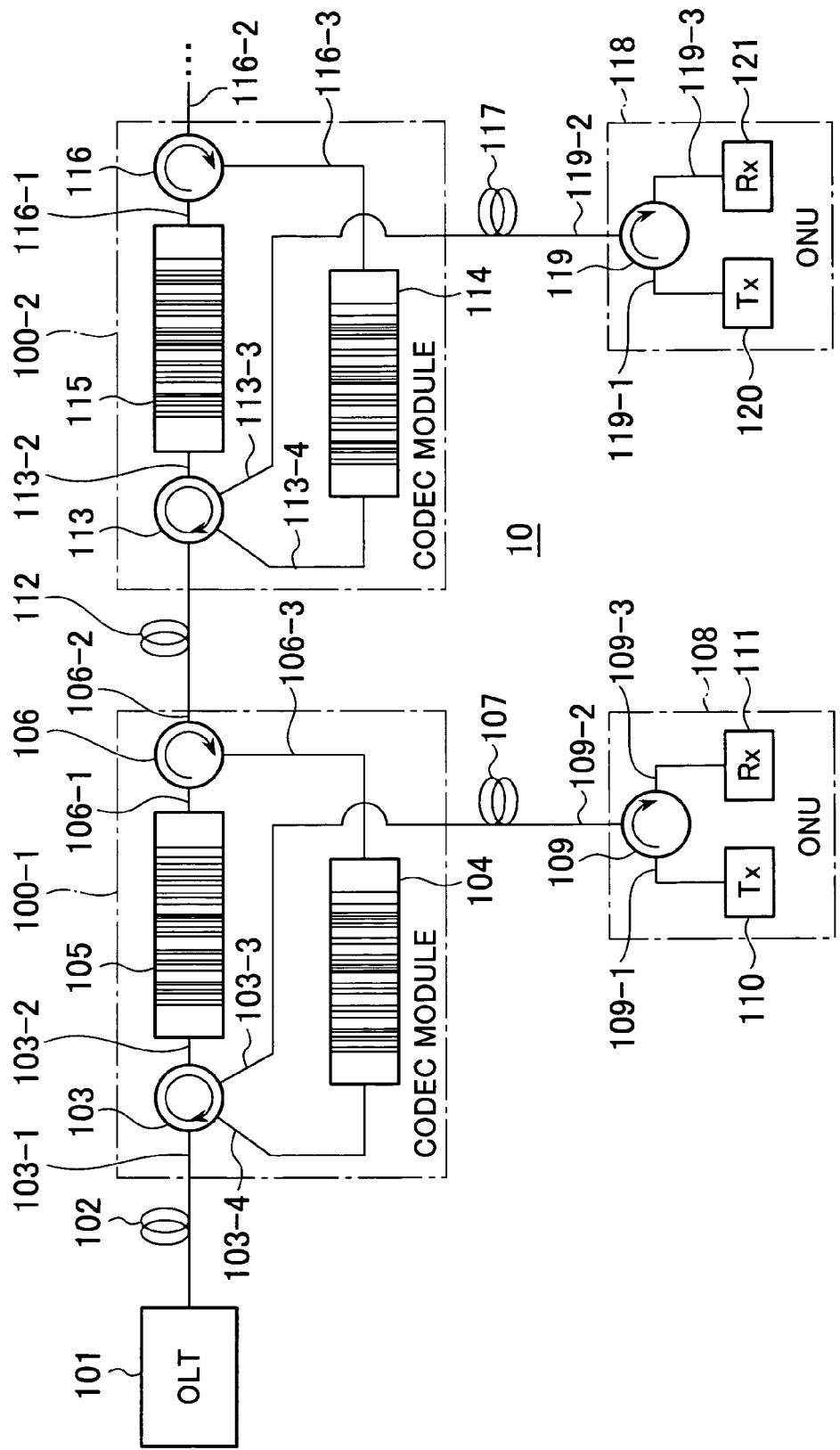
FIG. 1 schematically shows in a system diagram a passive optical communication network system according to an embodiment of the present invention.

Now, preferred embodiments of the present invention will be described in detail with reference to the accompanying drawings. FIG. 1 shows a passive optical communication network system 10 according to a preferred embodiment of the present invention to which the optical code division multiplexing (OCDM) scheme is applied. This passive optical communication network system 10 is formed by a single optical line terminal (OLT) 101, encoder/decoders (codecs) 100-1 and 100-2, and optical network units (ONUs) 108 and 118, which are interconnected by optical transmission lines 102, 112, 107 and 117, as depicted. For an illustrative purpose, the instant embodiment is formed so as to serve two subscribers. However, in practice, codecs, ONUs and transmission lines may be provided correspondingly, particularly in number, to subscribers to be served. This will be described later.

The OLT 101, which per se may be conventional, is an optical line termination unit located in the premises of a communication station to be adapted for transmitting and receiving an optical signal to and from the ONUs 108 and 118, which are optical line termination units positioned in the premises of subscribers. The OLT 101 may be configured by devices such as an optical transmitter/receiver and a multi-port optical encoder disclosed in Japanese '733 Publication earlier indicated. The transmission line 102 is a transmission medium having its one end connected to the OLT 101 and its other end connected to the codec 100-1 to bi-directionally convey an optical signal between the OLT 101 and the codec 100-1, and may be implemented by an optical fiber. The transmission line 112 has its one end connected to the codec 100-1 and its other end connected to the codec 100-2, and may be a medium similar to the transmission line 102.

The codec 100-1, formed in a codec module, is adapted for receiving a multiplexed optical signal transmitted over the transmission line 102 to decode a signal component of a channel to be transmitted to the ONU 108 to deliver a resultant decoded signal component to the transmission line 107, while passing a signal component or components of other channel or channels to the transmission line 112. The codec 100-1 is also adapted for encoding a transmission signal transmitted from the ONU 108 over the transmission line 107 to transmit a resultant encoded signal over the transmission line 102, while passing an encoded signal transmitted on the transmission line 112 to the transmission line 102.

The codec 100-1 includes, as shown in FIG. 1, circulators 103 and 106 and super-structured fiber Bragg gratings (SSF-BGs) 104 and 105, which are interconnected as illustrated. The one circulator 103 has four input/output ports to be adapted for passing an optical signal from one particular port to another. The ports connected to the transmission line 102, SSFBG 105, transmission line 107 and SSFBG 104 are designated with reference numerals 103-1, 103-2, 103-3 and 103-4, respectively. An optical signal inputted on the port 103-1 is outputted from the port 103-2. An optical signal inputted on the port 103-2 is outputted from the port 103-3. An optical signal inputted on the port 103-3 is outputted from the port 103-4. An optical signal inputted on the port 103-4 is outputted from the port 103-1. Between other ports than those combinations of ports, no optical signals are transferred. Signals are designated with reference numerals of connections on which they are conveyed.

Similarly, the other circulator 106 has three input/output ports to be adapted for passing an optical signal from one particular port to another. The ports connected to the SSFBG 105, transmission line 112 and SSFBG 104 are designated with reference numerals 106-1, 106-2 and 106-3, respectively. An optical signal inputted on the port 106-1 is outputted from the port 106-2. An optical signal inputted on the port 106-2 is outputted from the port 106-3. Between other ports than those combinations of ports, no optical signals are transferred.

The one SSFBG 104 serves as encoding an inputted optical signal and has two input/output ports 103-4 and 106-3, which are interconnected to the ports of the circulators 103 and 106, respectively.

The other SSFBG 105 functions as decoding an inputted optical signal and has two input/output ports 103-2 and 106-1, which are interconnected to the ports of the circulators 103 and 106, respectively.

The transmission line 107 is an optical transmission medium for transmitting an optical signal, and has its one end connected to the circulator 103 and its other end connected to a circulator 109 included in the ONU 108. The transmission line 107 may be implemented by an optical fiber.

The ONU 108 is an optical line termination unit located in the premises of a subscriber adapted for transmitting and receiving an optical signal to and from an optical terminal unit, such as OLT 101, arranged in the premises of a communication station. The ONU 108 includes, as shown in FIG. 1, an optical transmitter (Tx) 110 and an optical receiver (Rx) 111 in addition to the circulator 109.

The circulator 109 has three input/output ports and is adapted for passing an optical signal from one particular port to another. The ports connected to the optical transmitter 110, transmission line 107 and optical receiver 111 are designated with reference numerals 109-1, 109-2 and 109-3, respectively. An optical signal inputted on the port 109-1 is outputted from the port 109-2. An optical signal inputted on the port 109-2 is outputted from the port 109-3. Between other ports than those combinations of ports, no optical signals are transferred.

The optical transmitter 110 functions as modulating an optical beam with transmission information to form an optical signal to transmit the resultant optical signal from its port 109-1. The optical receiver 111 functions as converting an received optical signal on its port 109-3 to a corresponding electric signal to restore received information.

In an application where the network system 10 has only one subscriber to be served, the network system 10 may be configured by the OLT 101, the single codec 100-1 and the single ONU 108, which are interconnected by the transmission lines 102 and 107 as illustrated. To that system configuration, a component section corresponding to what includes the codec 100-2, the ONU 118, and the transmission lines 112 and 117 may be added in order to include an additional subscriber to be served. The codec 100-2, the ONU 118, and the transmission lines 112 and 117 thus interconnected may be configured similarly to the codec 100-1, the ONU 108, and the transmission lines 102 and 107, respectively. This means that a similar addition of one component section like the set of codec 100-1, ONU 108, and transmission lines 102 and 107 thus interconnected to the network system 10 will allow one additional subscriber to be served.

The additional codec 100-2 may be the same in structure as the codec 100-1 to form a codec module, which includes circulators 113 and 116 and SSFBGs 114 and 115, which are interconnected as depicted. The codec 100-2 is adapted for receiving a multiplexed optical signal transmitted over the transmission line 112 from the preceding stage, i.e. codec 100-1, to decode, or demodulate, a signal component of a channel to be transmitted to the ONU 118 to develop a resultant decoded signal component on the transmission line 117, while passing a signal component or components of other channel or channels to a transmission line 116-2 for transmission to a subsequent stage. The codec 100-2 is also adapted for encoding a transmission signal transmitted from the ONU 118 connected thereto over the transmission line 117 to transmit a resultant encoded signal to the transmission line 112, while passing an encoded signal transmitted from the subsequent stage over the transmission line 116-2 to the transmission line 112.

As described above, the network system 10 may be adaptively configured so as to additively include the component section, i.e. a codec module and its interconnections together with an ONU, correspondingly to a subscriber to be added, such as to form a telecommunications network based upon the bus type of topology.

Now, prior to describing the operation of the passive optical communication network system 10 configured as described above, in order to facilitate understanding the operation, the principle of encoding and decoding and an SSFBG type of optical encoder will be described with reference to FIGS. 2A, 2B and 2C, and 3. Although a variety of encoding principles have been proposed so far, only the principle relevant to understanding the present invention will be described.

Figure 2A:
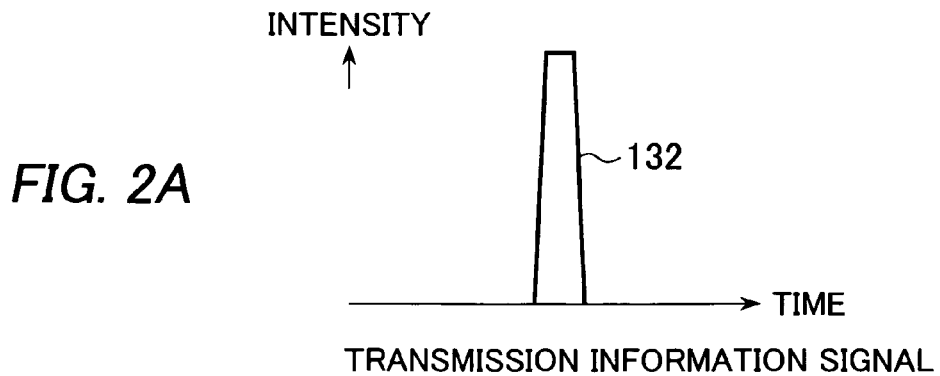
FIGS. 2A, 2B and 2C show waveforms respectively useful for understanding how to encode and decode optical code division multiplex signals.
Figure 2B:
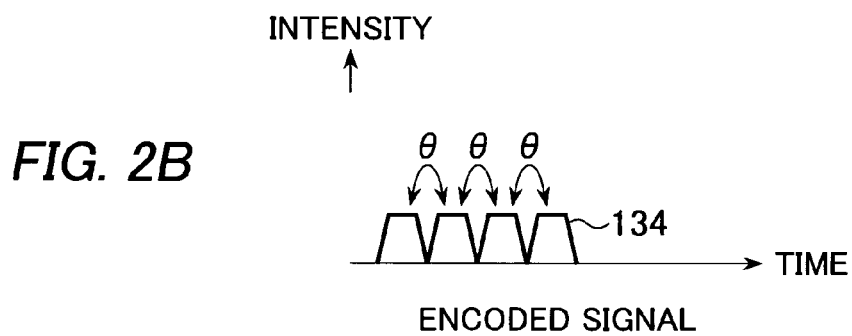

FIGS. 2A and 2B show a process for encoding. A transmission information signal is a light beam modulated with transmission information to be transmitted to form an optical pulse 132. For example, digital information is normally represented in binary by a bit taking its logical value "1" or "0", which corresponds to the presence or absence, respectively, of an optical pulse, which will be propagated in the order of the transmission information at an interval corresponding to a transmission rate. In order to simplify the description, FIG. 2A shows a sole pulse 132 as the transmission information signal to be transmitted.

Transmission information signal, in order to identify multiplexed channels on a receiver side, is secondary-modulated into waveforms different from channel to channel, including phase information. The secondary modulation is called coding. A coded optical signal may simply be referred to as a coded signal in the context. An original optical signal having a pulsated waveform is divided into a plurality of pulses 134, FIG. 2B, having the temporal position and phase thereof from each other. The number of these divided pulses is called a chip number, and a divided pulse is called a chip pulse. The phase relations between those chip pulses are parameters for identifying channels, and the identifiers thereof may be called a code pattern or simply code. Such coding is called coherent time spreading. The encoding procedure taught by Japanese '733 Publication earlier described and of the instant illustrative embodiment may be implemented by coherent time spreading, and further have such a characteristic that all phase differences are equal to each other between adjacent chip pulses. This phase difference is represented by a notation θ.

Figure 2C:
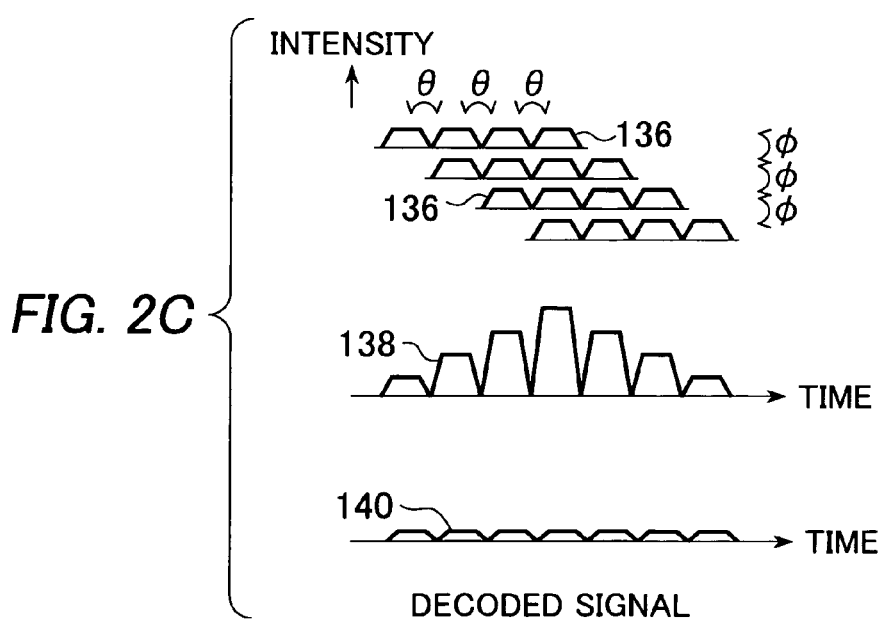

FIGS. 2B and 2C show a process for decoding. An incoming coded signal 134, FIG. 2B, is optically modulated through the same procedure as done when encoding. This optical modulation is called decoding, and a decoded optical signal may simply be called a decoded signal in the context. A coded signal having its waveform of a string of pulses is divided into plural pulse trains 136, FIG. 3C, which are different in temporal position and in phase between one another. Similarly to the process for encoding, the decoding procedure disclosed by the Japanese '733 Publication earlier described and of the present illustrative embodiment may have such a characteristic that all phase differences are equal between the adjacent pulse sequences. This phase difference is represented by a notation φ. Its identifier may also be called code pattern or simply code.

Such pulse trains 136 thus divided may partially overlap one another at particular times, as shown in FIG. 2C. Therefore, during the time when pulses overlap, the pulses 136 are added to each other in terms of complex electric field amplitude to thereby obtain a resultant new pulse. The addition of the complex electric field amplitude is performed in a period of time in which the overlapping pulses exist, thereby causing two kinds of optical waveforms 138 and 140 to be obtained. Namely, when the code θ in the process for coding is equal to the code φ in the process for decoding, the waveform 138 is obtained which is larger in peak intensity than otherwise. That waveform 138 is called an autocorrelation waveform. When the code θ is not equal to the code φ, the waveform 140 is obtained which does not have a particular intensity peak. That waveform 140 is called a cross-correlation waveform. With this scheme, the signal 138 having its waveform auto-correlated is higher in average power than the signal 140 having its waveform cross-correlated, and therefore, when the ratio of the average power of the former to the latter increases, the ability to identify channels can be considered to be improved.

Figure 3:
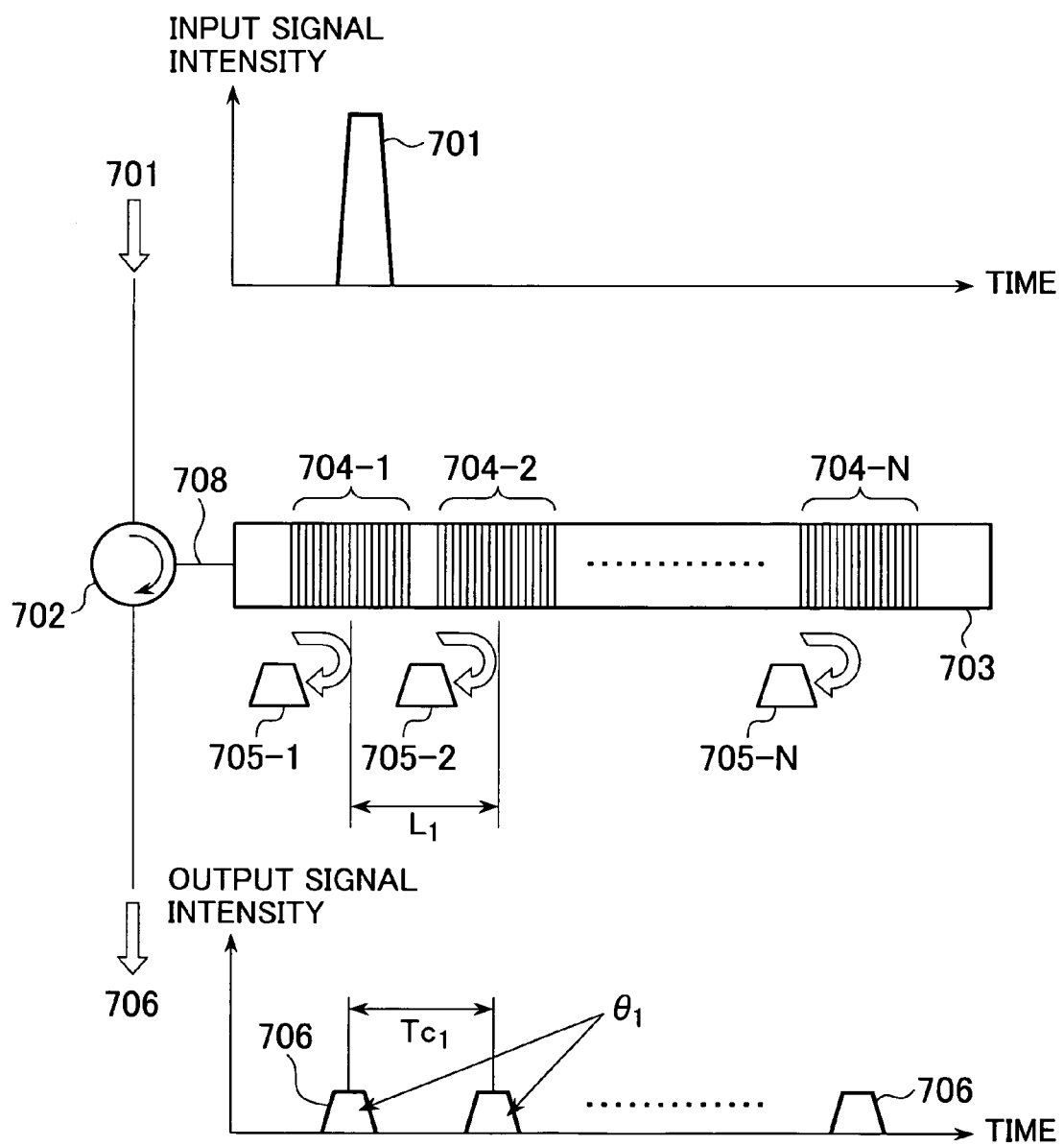
FIG. 3 is an explanatory diagram useful for understanding the operation of an SSFBG.

FIG. 3 shows the operation of encoding by means of the SSFBG. An optical signal 701 is inputted which has its waveform pulsated to have a temporal input signal intensity characteristic as plotted in the topmost part of the figure. The optical signal 701 is inputted through a circulator 702 to an SSFBG 703. The SSFBG 703 has a plurality (N) of unit gratings 704 connected in cascade as shown. Now, N is a natural number representing the number of chips, and the unit gratings 704 are designated with 704-1, 704-2, . . . , 704-N in the order from its input port 708.

The unit grating 704 allows an optical signal having its wavelength equal to the Bragg reflection wavelength to partially penetrate itself and be partially reflected thereon. Since the unit gratings are thus provided at N respective positions different from each other in the SSFBG 703, and all the unit gratings 704 have the Bragg reflection wavelengths equal to each other, when the optical signal 701 is inputted which has its wavelength equal to the Bragg reflection wavelength of the unit gratings 704, the inputted signal 701 is reflected at the N positions to be combined again. Now, light reflected on the unit grating 704-$i$ will be denoted as 705-$i$, where i is a natural number between unity and N, inclusive. This light 705-$i$ functions as a chip pulse described with reference to FIG. 2A.

Through the circulator 702, extracted is an optical signal reflected on the SSFBG 703 to thereby obtain an output optical signal 706, which has its intensity waveform containing N pulses having its temporal output signal intensity characteristic as plotted in the lowermost part of the figure.

A distance between the unit gratings 704-$j$ and 704-$(j+1)$ is designated with $L_j$, where j is a natural number between unity and N−1, inclusive. Under that condition, a time interval $Tc_j$ defined between the chip pulses 705-$j$ and 705-$(j+1)$ is equal to round-trip propagation time between the unit gratings 704-$j$ and 704-$(j+1)$ as represented by an expression (1):

$$Tc_j = 2n_{eff} L_j / c \tag{1}$$

where c is the light speed in vacuum, $\lambda_0$ is a wavelength of signal light, equal to the Bragg reflection wavelength of the unit grating 703, and $n_{eff}$ is an effective refraction index of the SSFBG.

The phase difference $\theta_j$ between the chip pulses 705-$j$ and 705-$(j+1)$ is found by an expression (2):

$$\theta_j = 4\pi n_{eff} L_j / \lambda_0 + 2\pi n \tag{2}$$

where n is an integer. The phase difference $\theta_j$ functions as a code pattern.

The operation of decoding by means of the SSFBG 703 may similarly be described with the input signal 701 taken as an encoded signal.

It is now assumed that the wavelength of light 701 inputted to the SSFBG 703 is equal to the Bragg reflection wavelength of the unit gratings 704 of the SSFBG 703. The refraction index profile of the unit gratings 704 may be adjusted to thereby control the refraction index of the unit gratings. When the refraction index is decreased, the power of the outputted light is decreased while the power of light emitted from the opposite output of the SSFBG 703 (referred to as transmitted light) is increased.

Next, the operation of the passive optical communication network system shown in FIG. 1 will be described. The encoding and decoding as described above are applied to the network system shown in FIG. 1.

First, the operation of downstream traffic, that is, in the direction from the OLT 101 to the ONUs 108 and 118, will be described. The OLT 101 encodes optical signals of all the channels transmitted from optical transmitters, not shown, and combines the encoded signals to transmit a resultant multiplexed signal over the single transmission line 102. The multiplexed signal is transmitted over the transmission line 102 and inputted to the circulator 103 and then to the SSFBG 105. A partial signal component of the multiplexed signal 103-2, corresponding to the channel assigned to the ONU 108, is reflected in the SSFBG 105 to thereby be decoded, thus being outputted from the same port 103-2 of the SSFBG 105 as the signal is inputted. The decoded signal is transmitted through the circulator 103 on the transmission line 107.

The decoded signal 107 is inputted to the ONU 108. In the ONU 108, the circulator 109 is adapted to discriminate the propagation directions between an upstream and a downstream signal. The inputted decoded signal 107 will be inputted as a downstream signal through the circulator 109 to the optical receiver 111, and converted therein to a corresponding electric signal 109-3 which conveys received information restored.

The other signal component of the multiplexed signal 103-1 inputted from the transmission line 102 to the SSFBG 105 is penetrated through the SSFBG 105 and transmitted through the circulator 106 to the transmission line 112.

The other multiplexed signal component transmitted over the transmission line 112 is inputted through the circulator 113 and thence to the SSFBG 115. Part of the other multiplexed signal component 113-2 is reflected in the SSFBG 115 to thereby be decoded, this being outputted from the same port 113-2 of the SSFBG 115 as the signal is inputted. The decoded signal is transmitted through the circulator 113 to the transmission line 117. The decoded signal 117 is inputted to the ONU 118. In the ONU 118, the inputted decoded signal 117 is inputted as a downstream signal through the circulator 119 to the optical receiver 111, and is converted therein to a corresponding electric signal that conveys received information restored.

Next, the operation of upstream traffic, i.e. in the direction from the ONUs 108 and 118 to the OLT 101, will be described. In the ONU 108, an optical signal 109-1 produced by the optical transmitter 110 is transmitted through the circulator 109 to the transmission line 107. The optical signal 109-2 is transmitted over the transmission line 107, and inputted through the circulator 103 to the SSFBG 104. The inputted optical signal 103-4 is, on one hand, reflected in the SSFBG 104 to thereby be encoded, thus being outputted from the same port 103-4 of the SSFBG 104 as the signal is inputted. The encoded signal, i.e. encoded optical signal of the channel assigned to the ONU 108, is transferred through the circulator 103 to the transmission line 102. On the other hand, part of the optical signal inputted to the SSFBG 104 penetrates the SSFBG 104 to be outputted on the port 106-3 opposite to the input port 103-4 of the SSFBG 104. The outputted signal is inputted to the port 106-3 of the circulator 106. However, the optical signal inputted to the port 106-3 will not be outputted on any ports. The circulator 106 may thus prevent the penetrating light from interfering with other upstream and downstream signals.

The optical signal 119-2 outputted from the other ONU 118 is transmitted over the transmission line 117 and inputted to the circulator 113 and further to the SSFBG 114. The inputted optical signal 113-4 is reflected in the SSFBG 114 to thereby be encoded, thus being outputted on the same port 113-4 of the SSFBG 114 as the signal is inputted. The encoded signal is transmitted through the circulator 113 to the transmission line 112.

The encoded signal 112 is inputted through the circulator 106 to the SSFBG 104. Part of the inputted signal 106-3 propagates through the SSFBG 104 to be outputted on the port 103-4 opposite to the input port 106-3. The encoded signal 103-4 is transferred through the circulator 103 to the transmission line 102. On the other hand, part of the encoded signal 106-3 inputted to the SSFBG 104 is reflected to be outputted on the same port 106-3 of the SSFBG 104 as the signal is inputted. The outputted signal is inputted to the port 106-3 of the circulator 106. However, the signal inputted to the port 106-3 will not be outputted on any ports. The circulator 106 may thus prevent this reflected light from interfering with other upstream and downstream signals.

Both encoded signals outputted from the ONUs 108 and 118 thus are transmitted to the transmission line 102, and are combined to be thereby converted to a multiplexed signal. Furthermore, when adding an ONU to the network system 10, the system 10 functions similarly so that the transmission line 102 conveys in the form of multiplexed signal the encoded signals of all the channels combined, and the transmission line 112 conveys the encoded signals other than the channel associated with the ONU 108 combined, while transmission lines subsequent thereto convey encoded signals combined in the same fashion. The OLT 101 decodes the multiplexed signal to deliver the decoded signals to appropriate channels.

Then, on each channel, the decoded signal may be converted to a corresponding electric signal to thereby restore the received information.

In summary, in the above-described embodiment, the functions of distributing signals in the downstream traffic and combining signals on the upstream traffic and the functions of encoding and decoding signals for identifying channels may be combined to be implemented on a single device, such as the codec 100-1 or 100-2. Therefore, the components of the entire system 10 may be reduced in number. Additionally, a loss, specific to, and depending on, the number of branches, does not affect optical signals. Therefore, an appropriate designing of the reflection and penetration ratios of an encoder or decoder will permit the level diagram of optical signals to be freely adjusted, thereby improving the availability of the power of optical signals. Additionally, since the passive optical network (PON) of the instant embodiment is a bidirectional transmission system, optical fibers and installation space for the transmission lines may be reduced. The above-described embodiment does not include a star coupler as requiring the number of branches to be fixed. Therefore, subscribers may be readily increased or decreased, and the bus type of topology may be applied to affiliate subscribers broadly distributed in a variety of sites.

Now, with reference to FIG. 4, an alternative embodiment of a passive optical communication network system 10a will be described according to the present invention. This passive optical communication network system 10a may be the same as the illustrative embodiment shown in and described with reference to FIG. 1, except for including, rather than ONUs 108 and 118, star couplers 208 and 218, and ONUs 210-1 to 210-m and 220-1 to 220-n, which are interconnected as illustrated by optical transmission lines 209-1 to 209-m and 219-1 to 219-n, where m and n are natural numbers which may be equal to or different from each other. The remaining components may be the same as the illustrative embodiment shown in and described with reference to FIG. 1. As such, like components are designated with the same reference numerals, and a repetitive description thereon will be omitted.

The star coupler 208 splits an optical signal received on the transmission line 107 to output resultant split signals on the transmission lines 209-1 to 209-m, or combines optical signals received on the transmission lines 209-1 to 209-m to output a resultant combined signal on the transmission line 107. Similarly, the star coupler 218 splits an optical signal received on the transmission line 117 to output a resultant split signal on the transmission lines 219-1 to 219-n, or combines optical signals received on the transmission lines 219-1 to 219-n to output a resultant combined signal on the transmission line 117.

The ONUs 210-1 to 210-m are connected to the transmission lines 209-1 to 209-m, respectively. The ONUs 220-1 to 220-n are connected to the transmission lines 219-1- to 219-n, respectively.

Figure 4:
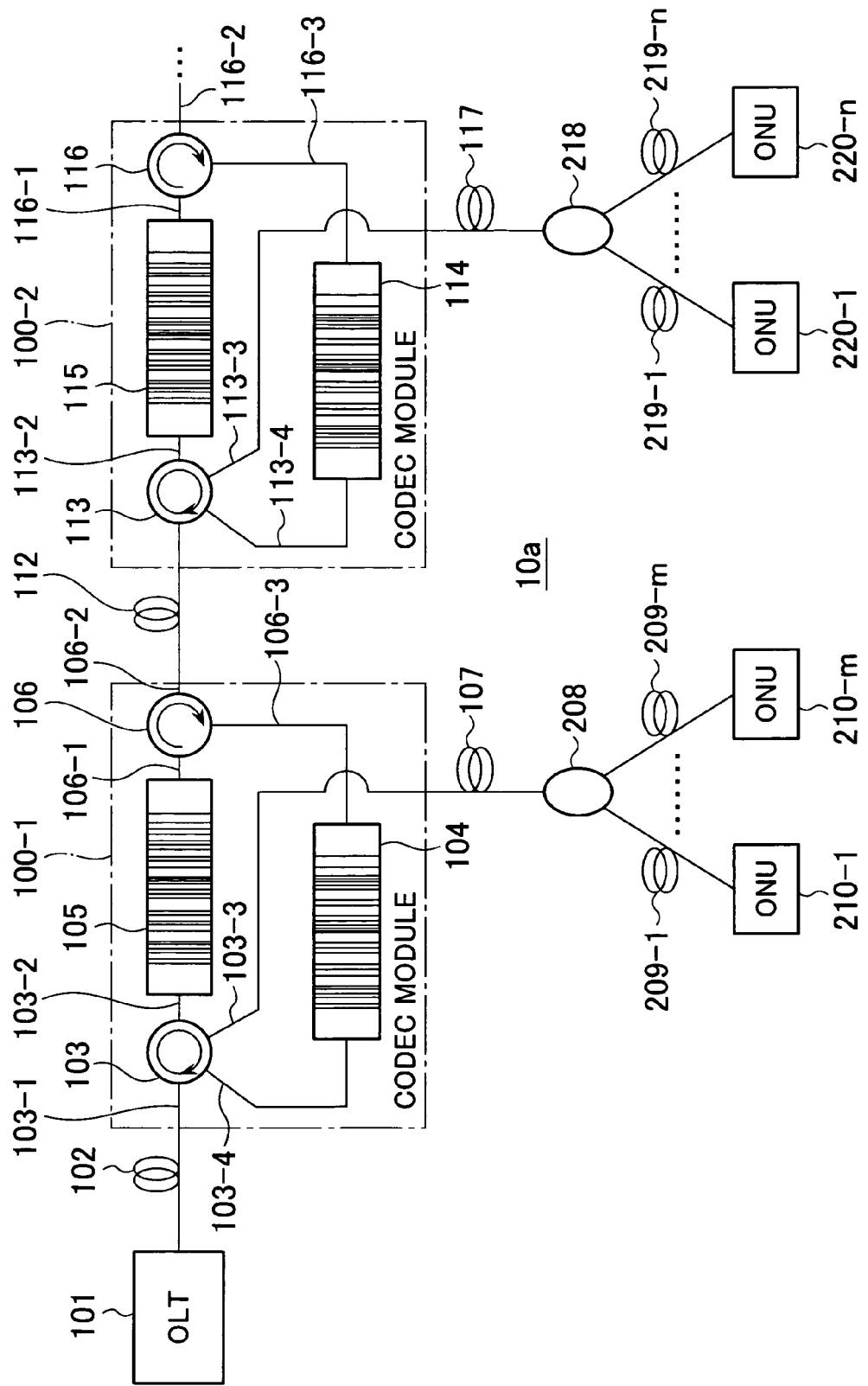
FIG. 4 schematically shows, like FIG. 1, a passive optical communication network system according to an alternative embodiment of the present invention.

In operation, on the downstream traffic in the passive optical communication network system 10a shown in FIG. 4, the OLT 101 encodes optical signals of all the channels transmitted from optical transmitters, not shown, and combines the encoded signals to transmit a resultant multiplexed signal over the transmission line 102. A partial signal component of the multiplexed signal 102 is decoded by the codec 100-1 to be transmitted on the transmission line 107. The decoded signal 107 is split by the star coupler 208. Then, the decoded signals thus split are transferred to the ONUs 210-1 to 210-m over the transmission lines 209-1 to 209-m, respectively. The other signal component of the multiplexed signal passing through the codec 100-1 is supplied over the transmission line 112 to the codec 100-2, in which a partial signal component of the other signal component is in turn decoded to be transmitted on the transmission line 117. The decoded signal 117 is split by the other star coupler 218. Then, the decoded signals thus split are transferred to the ONUs 220-1 to 220-n over the transmission lines 219-1 to 219-n, respectively.

On the upstream traffic, optical signals outputted from the ONUs 210-1 to 210-m are transferred over the transmission lines 209-1 to 209-m, respectively, and combined by the star coupler 208. Then, the combined signal is supplied to the codec 100-1 over the transmission line 107. The codec 100-1 encodes the combined signal 107 to output an encoded signal on the transmission line 102. Optical signals outputted from the other ONUs 220-1 to 220-n are transmitted over the transmission lines 219-1 to 219-n, respectively, and combined by the star coupler 218. Then, the combined signal 117 is supplied to the codec 100-2 over the transmission line 117. The codec 100-2 encodes the combined signal 117 to output a resultant encoded signal on the transmission line 112.

The encoded signal transmitted on the transmission line 112 passes through the codec 100-1 to be transferred on the transmission line 102. The encoded signals individually outputted on the transmission line 102 are combined to be thereby converted to a multiplexed signal, which will in turn be supplied to the OLT 101. In the alternative embodiment, the star coupler 208 is adapted to combine the optical signals from the ONUs 210-1 and 210-m with each other by means of multiplexing, for example, time division multiplexing (TDM) or wavelength division multiplexing (WDM), thus being prevented from interfering with each other.

It is to be noted that the codecs 100-1 and 100-2 in the alternative embodiment may operate as described with reference to the illustrative embodiment shown in FIG. 1.

A component section corresponding to what includes the transmission line 102, the codec 100-1, the transmission line 107, the star coupler 208, the transmission lines 209-1 to 209-m and the ONUs 210-1 to 210-m, or a component section including the transmission line 112, the codec 100-2, the transmission line 117, the star coupler 218, the transmission lines 219-1 to 219-n and the ONUs 220-1 to 220-n may be additionally connected to the port 116-2, FIG. 4, of the circulator 116 in the codec 100-2 to thereby increase the number of subscribers to be served. This means that plural PON systems may be connected to the network system 10 shown in FIG. 1 to thereby constitute a larger network.

In the passive optical communication network system 10a of FIG. 4, the network may be expanded by a combination of conventional PON and OCDM systems. Therefore, synchronization is unnecessary between conventional PONs that utilize encoding/decoding by different SSFBGs, and thus existing systems may be reutilized in terms of control and management of the systems. Additionally, compared with conventional PONs in which an increase in subscriber causes, a decrease in transmission rate for each subscriber due to multiplexing only on the time axis, a decrease in transmission rate due to an increase in subscriber may be minimized. Therefore, the network may be efficiently expanded by stepwise equipment investment.

The entire disclosure of Japanese patent application No. 2010-86179 filed on Apr. 2, 2010, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What I claim is:

1. A passive optical communication network system comprising:
a first optical line termination unit for use in a communication station for transmitting on a first optical transmission line an optical signal carrying information of a plurality of channels encoded by optical code division multiplexing, and for decoding an optical signal supplied from the first optical transmission line to receive information of the plurality of channels;
a second optical line termination unit for use at a subscriber site for transmitting and receiving the optical signal of one of the plurality of channels on a second optical transmission line;
a first super-structured fiber Bragg grating (SSFBG) having a first one end and a first other end for receiving the encoded optical signal on the first one end to decode an optical signal of the one channel to output the decoded optical signal from the first one end, and to output an optical signal of channels other than the one channel from the first other end;
a second SSFBG having a second one end and a second other end for receiving the optical signal of the one channel on the second one end to encode the optical signal of the one channel to output the encoded optical signal from the second one end, and for receiving the optical signal on the second other end to output the received optical signal from the second one end;
a first circulator having first to fourth ports for receiving the optical signal on the first port from the first optical transmission line to output the received optical signal from the second port to the first one end of said first SSFBG, for receiving the decoded optical signal on the second port from the first one end of said first SSFBG to output the decoded optical signal from the third port to the second optical transmission line, for receiving the optical signal on the third port from the second optical transmission line to output the received optical signal from the fourth port to the second one end of said second SSFBG, and for receiving the encoded optical signal on the fourth port from the second one end of said second SSFBG to output the encoded optical signal from the first port to the first optical transmission line; and
a second circulator having fifth, sixth and seventh ports for receiving the optical signal on the fifth port from the first other end of said first SSFBG to output the received optical signal from the sixth port, and for receiving the encoded optical signal on the sixth port to output the encoded optical signal from the seventh port to the second other end of said second SSFBG.

2. The system in accordance with claim 1, further comprising an additional second optical line termination unit for use at an additional subscriber site for transmitting and receiving the optical signal of another one of the plurality of channels on an additional second optical transmission line; and
a component section which comprises:
an additional first SSFBG having a first one end and a first other end for receiving the encoded optical signal on the first one end to decode an optical signal of the other one channel to output the decoded optical signal from the first one end, and to output an optical signal of channels other than the other one channel from the first other end;
an additional second SSFBG having a second one end and a second other end for receiving the optical signal of the other one channel on the second one end to encode the optical signal of the other one channel to output the encoded optical signal from the second one end, and for receiving the optical signal on the second other end to output the received optical signal from the second one end;

an additional first circulator having first to fourth ports for receiving the optical signal on the first port from an additional first optical transmission line to output the received optical signal from the second port to the first one end of said additional first SSFBG, for receiving the decoded optical signal on the second port from the first one end of said additional first SSFBG to output the decoded optical signal from the third port to the additional second optical transmission line, for receiving the optical signal on the third port from the additional second optical transmission line to output the received optical signal from the fourth port to the second one end of said additional second SSFBG, and for receiving the encoded optical signal on the fourth port from the second one end of said additional second SSFBG to output the encoded optical signal from the first port to the additional first optical transmission line; and an additional second circulator having fifth, sixth and seventh ports for receiving the optical signal on the fifth port from the first other end of said additional first SSFBG to output the received optical signal from the sixth port, and for receiving the encoded optical signal on the sixth port to output the encoded optical signal from the seventh port to the second other end of said additional second SSFBG, the first port of said additional first circulator of said component section being connected to the seventh port of said second SSFBG to thereby form a communication network of a bus type of topology.

3. The system in accordance with claim 1, wherein said second optical line termination unit comprises:

an optical transmitter for converting transmission information to an optical signal to transmit the converted signal as the optical signal of the one channel;

an optical receiver for receiving the decoded optical signal of the one channel to convert the received signal to an electric signal representing the information; and a third circulator having eighth, ninth and tenth ports for receiving the optical signal on the eighth port from said optical transmitter to output the received optical signal from the ninth port to the second optical transmission line, and for receiving the decoded optical signal of the one channel on the ninth port from the said second optical transmission line to supply the decoded optical signal from the tenth port to said optical receiver.

4. The system in accordance with claim 1, further comprising:

a star coupler connected to the second optical transmission line; and a plurality of third optical transmission lines connected to said second optical line termination unit, one of said plurality of third optical transmission lines being connected to said second optical line termination unit, and another one of said plurality of third optical transmission lines being connected to an additional second optical line termination unit for use at an additional subscriber site, said star coupler receiving the decoded optical signal from the second optical transmission line to split the decoded optical signal to supply the split optical signals to said second optical line termination units over said one and other third optical transmission lines, and for receiving the optical signals from said second optical line termination units on said one and other third optical transmission lines to combine the received optical signals to output the combined optical signal to said second optical transmission line.

5. A codec module for use in a passive optical network, comprising:

a first super-structured fiber Bragg grating (SSFBG) having a first one end and a first other end for receiving an optical signal encoded by optical code division multiplexing on the first one end to decode an optical signal of a predetermined channel to output the decoded optical signal from the first one end, and to output an optical signal of channels other than the predetermined channel from the first other end;

a second SSFBG having a second one end and a second other end for receiving the optical signal of the predetermined channel on the second one end to encode the optical signal of the predetermined channel to output the encoded optical signal from the second one end, and for receiving the optical signal on the second other end to output the received optical signal from the second one end;

a first circulator having first to fourth ports for receiving the optical signal on the first port to output the received optical signal from the second port to the first one end of said first SSFBG, for receiving the decoded optical signal on the second port from the first one end of said first SSFBG to output the decoded optical signal from the third port, for receiving the optical signal on the third port to output the received optical signal from the fourth port to the second one end of said second SSFBG, and for receiving the encoded optical signal on the fourth port from the second one end of said second SSFBG to output the encoded optical signal from the first port; and a second circulator having fifth, sixth and seventh ports for receiving the optical signal on the fifth port from the first other end of said first SSFBG to output the received optical signal from the sixth port, and for receiving the encoded optical signal on the sixth port to output the encoded optical signal from the seventh port to the second other end of said second SSFBG.

* * * * *